United States Patent
Kim et al.

(10) Patent No.: US 11,160,114 B2
(45) Date of Patent: Oct. 26, 2021

(54) METHOD FOR TRANSMITTING AND RECEIVING PHYSICAL RANDOM ACCESS CHANNEL IN COMMUNICATION SYSTEM

(71) Applicant: ELECTRONICS AND TELECOMMUNICATIONS RESEARCH INSTITUTE, Daejeon (KR)

(72) Inventors: Jun Hyeong Kim, Daejeon (KR); Bing Hui, Daejeon (KR); Il Gyu Kim, Chungcheongbuk-do (KR); Go San Noh, Daejeon (KR); Hee Sang Chung, Daejeon (KR); Sung Woo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 41 days.

(21) Appl. No.: 16/181,448

(22) Filed: Nov. 6, 2018

(65) Prior Publication Data

US 2019/0159259 A1 May 23, 2019

(30) Foreign Application Priority Data

Nov. 17, 2017 (KR) .................. 10-2017-0154318
Sep. 6, 2018 (KR) .................. 10-2018-0106711

(51) Int. Cl.
*H04W 74/08* (2009.01)
*H04W 74/00* (2009.01)

(52) U.S. Cl.
CPC ..... *H04W 74/0833* (2013.01); *H04W 74/006* (2013.01)

(58) Field of Classification Search
CPC ........... H04W 74/0833; H04W 74/004; H04W 72/0453; H04W 72/042; H04W 74/006; H04W 72/0493; H04W 72/10; H04W 72/1257
See application file for complete search history.

(56) References Cited

U.S. PATENT DOCUMENTS

| 9,781,747 | B2 | 10/2017 | Kim et al. |
| 2015/0365978 | A1 | 12/2015 | Kim et al. |
| 2016/0150541 | A1 | 5/2016 | Park et al. |
| 2016/0242213 | A1 | 8/2016 | Dabeer et al. |
| 2016/0309507 | A1 | 10/2016 | Park |

(Continued)

OTHER PUBLICATIONS

Kim et al., U.S. Appl. No. 62/535,941, filed Jul. 23, 2017.*

(Continued)

*Primary Examiner* — Jackie Zuniga Abad
*Assistant Examiner* — Sun Jong Kim
(74) *Attorney, Agent, or Firm* — LRK Patent Law Firm

(57) ABSTRACT

An operation method of a terminal in a communication system includes receiving a message from a base station, the message including physical random access channel (PRACH) configuration information indicating a PRACH slot; determining a start symbol to which a PRACH is mapped among symbols constituting the PRACH slot based on a type of the PRACH slot; mapping the PRACH from the start symbol in the PRACH slot; and transmitting the PRACH mapped to the PRACH slot to the base station.

13 Claims, 10 Drawing Sheets

(56) References Cited

U.S. PATENT DOCUMENTS

| | | | |
|---|---|---|---|
| 2016/0309518 A1 | 10/2016 | Patel et al. | |
| 2017/0245223 A1 | 8/2017 | Nan et al. | |
| 2017/0257898 A1* | 9/2017 | Maaref | H04W 76/14 |
| 2017/0367122 A1 | 12/2017 | Baldemair et al. | |
| 2018/0160453 A1* | 6/2018 | Lee | H04W 48/12 |
| 2018/0324623 A1* | 11/2018 | Jung | H04W 74/0833 |
| 2019/0082427 A1* | 3/2019 | Kim | H04L 5/0053 |
| 2019/0281624 A1* | 9/2019 | Kim | H04W 74/08 |

OTHER PUBLICATIONS

U.S. Appl. No. 62/502,400 (Year: 2017).*
"RAN1 Chairman's Notes", 3GPP TSG RAN WG1 Meeting 90bis, Prague, CZ, Oct. 9-13, 2017.
LG Electronics, "Discussion on PRACH preamble format details", 3GPP TSG RAN WG1 Meeting #90bis, R1-1717930, Prague, CZ, Oct. 9-13, 2017.

* cited by examiner

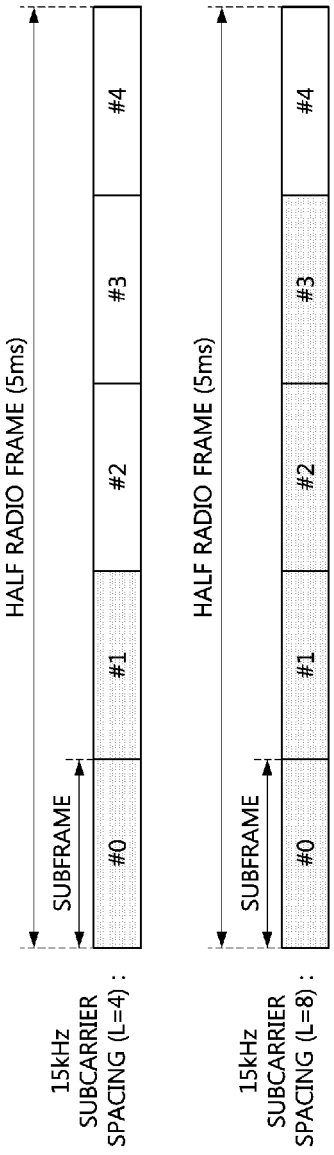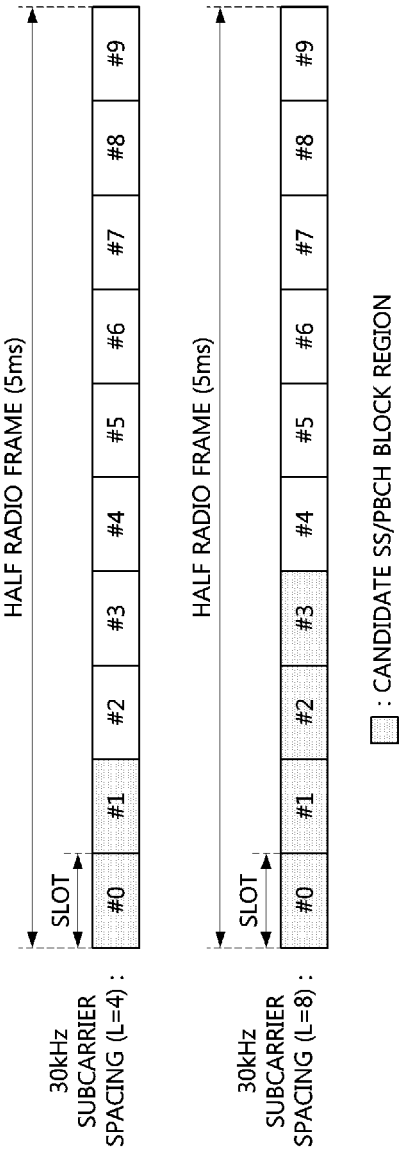

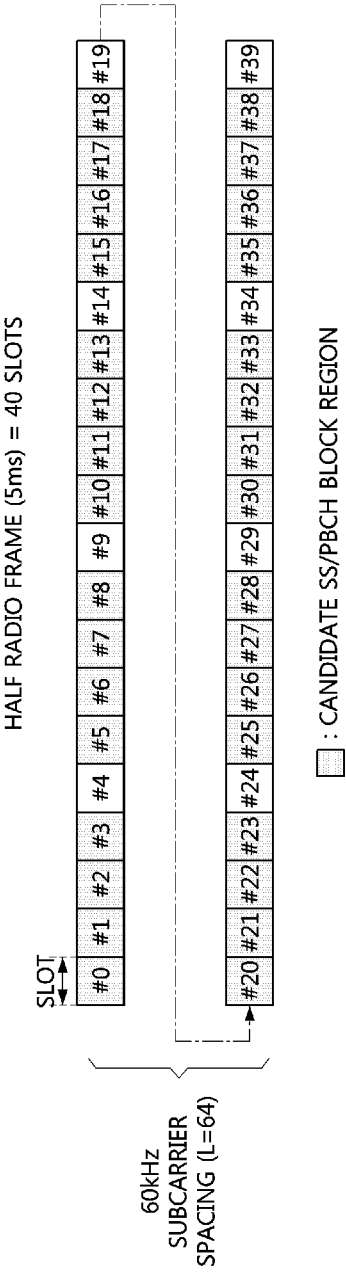

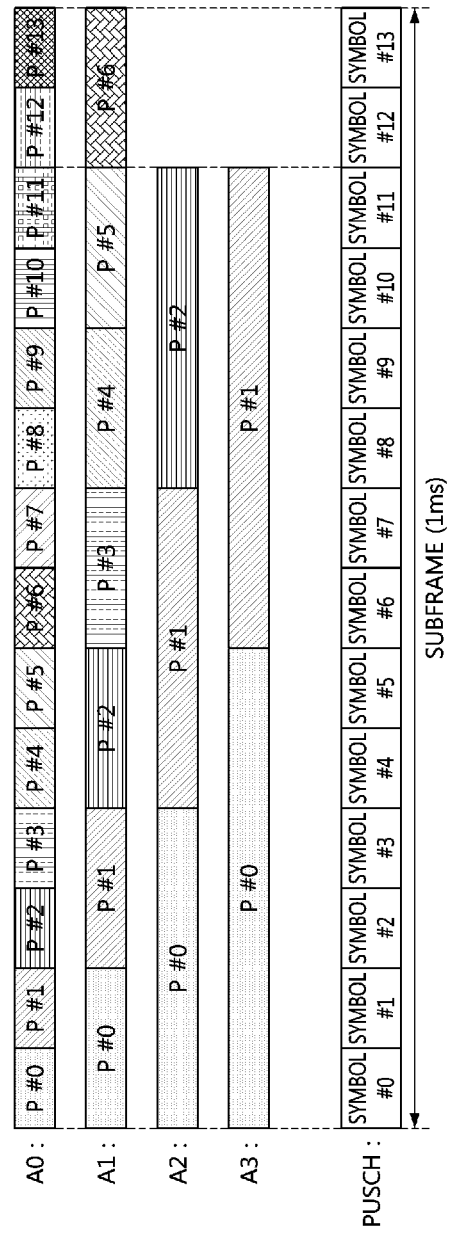

METHOD FOR TRANSMITTING AND RECEIVING PHYSICAL RANDOM ACCESS CHANNEL IN COMMUNICATION SYSTEM

CROSS-REFERENCE TO RELATED APPLICATIONS

This application claims priority to Korean Patent Application Nos. 10-2017-0154318, filed Nov. 17, 2017, and 10-2018-0106711, filed Sep. 6, 2018, in the Korean Intellectual Property Office (KIPO), the entire contents of which are hereby incorporated by reference.

BACKGROUND

1. Technical Field

The present disclosure relates to a technique for transmitting and receiving a physical random access channel (PRACH), and more particularly, to a technique for mapping the PRACH to physical resources in the 5G communication system.

2. Description of Related Art

With the development of information and communication technologies, various wireless communication technologies are being developed. Typical wireless communication technologies include long term evolution (LTE), new radio (NR), etc. defined in 3GPP (3rd Generation Partnership Project) standard. The LTE may be one of the fourth generation (4G) wireless communication technologies, and the NR may be one of the 5th generation (50) wireless communication technologies.

A 5G communication system (e.g., NR communication system) using a frequency band (e.g., a frequency band of 6 GHz or above) higher than the frequency band (e.g., a frequency band of 6 GHz or below) of the 4G communication system (e.g., LTE communication system) as well as the frequency band of the 4G communication system is being considered for processing of the rapidly increasing wireless data after commercialization of the 4G communication system. The 5G communication system can support an enhanced mobile broadband (eMBB) service, an ultra-reliable and low-latency communication (URLLC) service, and a massive machine type communication (mMTC) service.

In the 5G communication system, a numerology, a slot format, frame configuration, the number of synchronization and physical broadcast channel (SS/PBCH) blocks, a cycle of the SS/PBCH blocks, a preamble format, and the like may be variously configured, and methods for transmitting and receiving a physical random access channel (PRACH) applicable to the 5G communication system supporting such the various configurations are required.

SUMMARY

Accordingly, embodiments of the present disclosure provide a method and an apparatus for transmitting and receiving a physical random access channel (PRACH) in a communication system.

In order to achieve the objective of the present disclosure, an operation method of a terminal in a communication system may comprise receiving a message from a base station, the message including physical random access channel (PRACH) configuration information indicating a PRACH slot; determining a start symbol to which a PRACH is mapped among symbols constituting the PRACH slot based on a type of the PRACH slot; mapping the PRACH from the start symbol in the PRACH slot; and transmitting the PRACH mapped to the PRACH slot to the base station.

The PRACH configuration information may include information indicating a PRACH configuration period and information indicating the PRACH slot located in the PRACH configuration period.

The message including the PRACH configuration information may be a synchronization signal and physical broadcast channel (SS/PBCH) block.

When the type of the PRACH slot is a pure uplink slot composed only of uplink symbols, the start symbol may be a first symbol among the symbols constituting the PRACH slot.

When the type of the PRACH slot is a dominant uplink slot composed of at least one uplink symbol, at least one unknown symbol, and at least one downlink symbol, the start symbol may be a third symbol among the symbols constituting the PRACH slot.

The type of the PRACH slot may be estimated as a dominant uplink slot composed of at least one uplink symbol, at least one unknown symbol, and at least one downlink symbol, when the terminal operates in a radio resource control (RRC) idle state.

The type of the PRACH slot may be determined based on a slot format indication (SFI) received from the base station, when the terminal operates in a radio resource control (RRC) connected state.

The PRACH may be multiplexed in the PRACH slot based on at least one of a frequency division multiplexing (FDM) scheme and a code division multiplexing (CDM) scheme.

The information indicating a multiplexing scheme available in the PRACH slot and the maximum number of PRACHs multiplexed in the PRACH slot may be obtained from the message received from the base station.

In order to achieve the objective of the present disclosure, an operation method of a base station in a communication system may comprise configuring a physical random access channel (PRACH) configuration period; configuring a PRACH slot located in the PRACH configuration period; and transmitting a message including information indicating the PRACH configuration period and the PRACH slot.

The message may further include information indicating a multiplexing scheme available in the PRACH slot and the maximum number of PRACHs multiplexed in the PRACH slot, and the multiplexing scheme may be at least one of a frequency division multiplexing (FDM) scheme and a code division multiplexing (CDM) scheme.

The start symbol to which a PRACH is mapped among symbols constituting the PRACH slot may be determined based on a type of the PRACH slot, and the type of the PRACH slot may be a pure uplink slot composed only of uplink symbols, or a dominant uplink slot composed of at least one uplink symbol, at least one unknown symbol, and at least one downlink symbol.

The message may be a synchronization signal and physical broadcast channel (SS/PBCH) block.

In order to achieve the objective of the present disclosure, a terminal in a communication system may comprise a processor and a memory storing at least one instruction executed by the processor. Also, the at least one instruction may be configured to receive a message from a base station, the message including physical random access channel (PRACH) configuration information indicating a PRACH slot; determine a start symbol to which a PRACH is mapped among symbols constituting the PRACH slot based on a type of the PRACH slot; map the PRACH from the start symbol in the PRACH slot; and transmit the PRACH mapped to the PRACH slot to the base station.

The PRACH configuration information may include information indicating a PRACH configuration period and information indicating the PRACH slot located in the PRACH configuration period.

When the type of the PRACH slot is a pure uplink slot composed only of uplink symbols, the start symbol may be a first symbol among the symbols constituting the PRACH slot.

When the type of the PRACH slot is a dominant uplink slot composed of at least one uplink symbol, at least one unknown symbol, and at least one downlink symbol, the start symbol may be a third symbol among the symbols constituting the PRACH slot.

The type of the PRACH slot may be estimated as a dominant uplink slot composed of at least one uplink symbol, at least one unknown symbol, and at least one downlink symbol, when the terminal operates in a radio resource control (RRC) idle state.

The type of the PRACH slot may be determined based on a slot format indication (SFI) received from the base station, when the terminal operates in a radio resource control (RRC) connected state.

The PRACH may be multiplexed in the PRACH slot based on at least one of a frequency division multiplexing (FDM) scheme and a code division multiplexing (CDM) scheme.

According to the embodiments of the present disclosure, the base station may transmit a message including physical random access channel (PRACH) configuration information to the terminal, and the terminal may map the PRACH to a specific symbol in the PRACH slot indicated by the PRACH configuration information received from the base station. Further, the PRACH can be multiplexed based on at least one of the time division multiplexing (TDM) scheme, the frequency division multiplexing (FDM) scheme, and the code division multiplexing (CDM) scheme in the PRACH slot indicated by the PRACH configuration information.

Also, the channel state information-reference signal (CSI-RS) may be associated with the PRACH resource (e.g., the PRACH configuration period, the PRACH slot), and in this case, the terminal can identify the PRACH resource based on the CSI-RS, and transmit the PRACH in the identified PRACH resource. Therefore, the transmission and reception procedure of the PRACH in the communication system can be efficiently performed, and the performance of the communication system can be improved.

BRIEF DESCRIPTION OF DRAWINGS

Embodiments of the present disclosure will become more apparent by describing in detail embodiments of the present disclosure with reference to the accompanying drawings, in which:

FIG. 4 is a conceptual diagram illustrating a first embodiment of candidate SS/PBCH block regions in a communication system;

FIG. 5 is a conceptual diagram illustrating a second embodiment of candidate SS/PBCH block regions in a communication system;

FIG. 6 is a conceptual diagram illustrating a third embodiment of candidate SS/PBCH block regions in a communication system;

FIG. 9A is a conceptual diagram illustrating a first embodiment of short sequences according to preamble formats in a communication system;

DETAILED DESCRIPTION OF THE INVENTION

Figure 1:
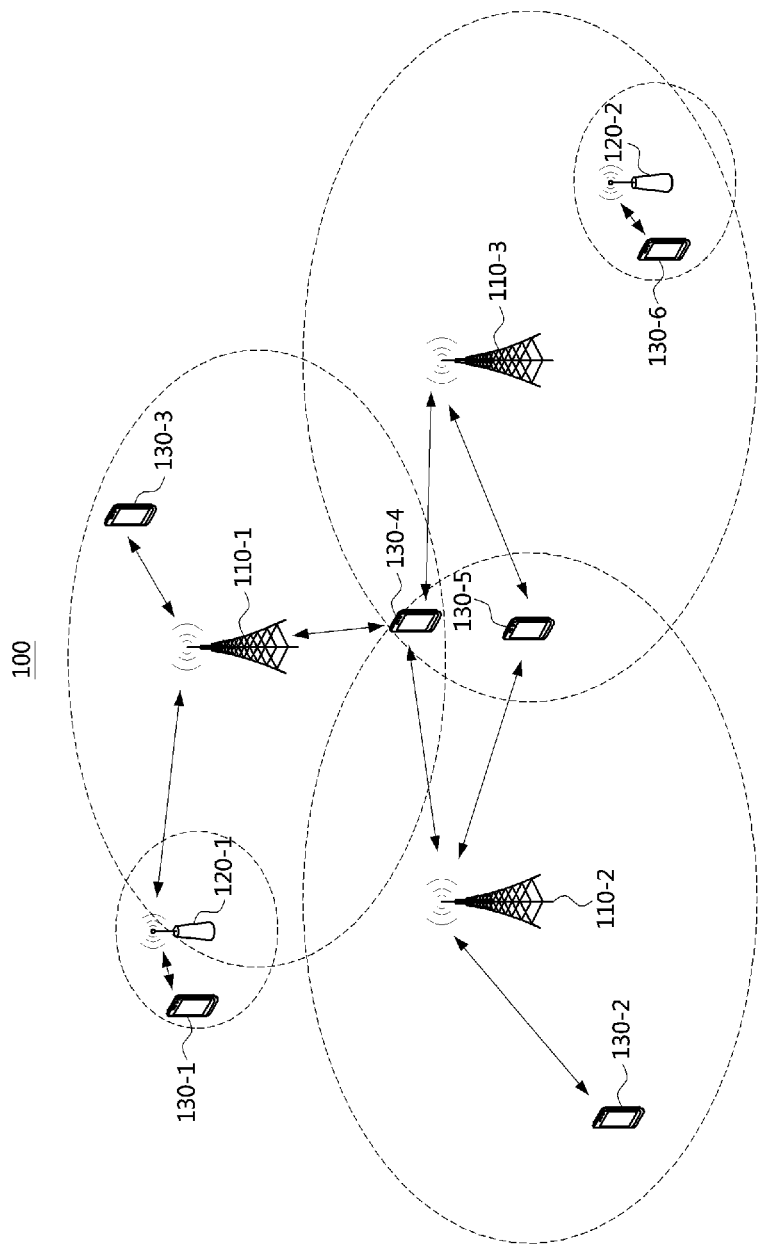
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which embodiments of the present disclosure are applied will be described. The communication system may be the 4G communication system (e.g., the long-term evolution (LTE) communication system, the LTE-Advance (LTE-A) communication system, or the like), the 5G communication system (e.g. the NR communication system), or the like. The 4G communication system may support communications in a frequency band of 6 GHz or below, and the 5G communication system may support communications in a frequency band of 6 GHz or above as well as the frequency band of 6 GHz or below.

The embodiments according to the present disclosure may be performed in communication systems supporting multi-beam operations as well as single-beam operations. Also, the communication systems to which the embodiments according to the present disclosure are applied are not restricted to what will be described below. That is, the embodiments according to the present disclosure may be applied to various communication systems. Here, the term 'communication system' may be used with the same meaning as the term 'communication network', the term 'LTE' may indicate '4G communication system', 'LTE communication system', or 'LTE-A communication system', and the term 'NR' may indicate '5G communication system' or 'NR communication system'.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further include a core network (e.g., a serving gateway (S-GW), a packet data network (PDN) gateway (P-GW), a mobility management entity (MME), or the like). In the case that the communication system is the 5G communication system (e.g., NR system), the core network may comprise an access and mobility management function (AMF), a user plane function (UPF), a session management function (SMF), or the like.

The plurality of communication nodes may support 4th generation (4G) communication (e.g., long term evolution (LTE), LTE-advanced (LTE-A)), 5th generation (5G) communication, or the like. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a cyclic prefix OFDM (CP-OFDM) based communication protocol, a discrete Fourier transform spread OFDM (DFT-s-OFDM) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, and a space division multiple access (SDMA) based communication protocol. Each of the plurality of communication nodes may have the following structure.

Figure 2:
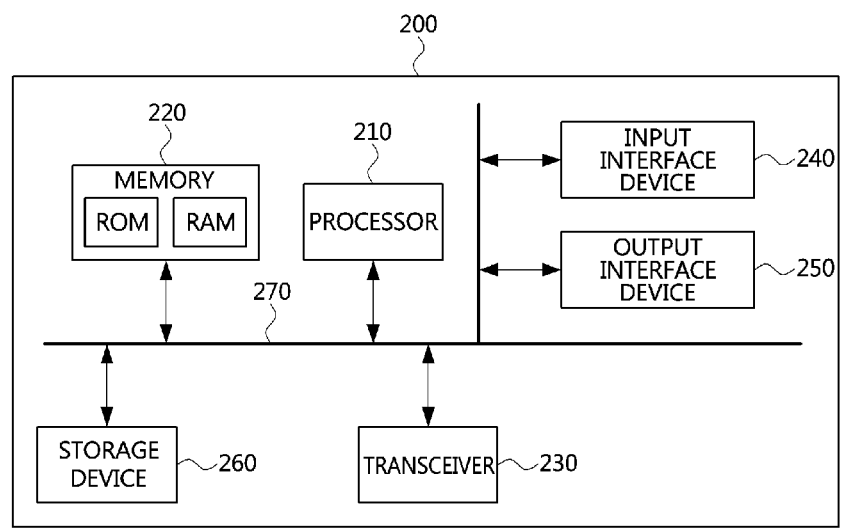
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a gNB, an ng-eNB, a high reliability base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability relay station (HR-RS), a home NodeB (HNB), a home eNodeB (HeNB), a road side unit (RSU), a radio remote head (RRH), a transmission point (TP), a transmission and reception point (TRP), a flexible TRP (f-TRP), or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, a device supporting internet of things (IoT) functions, a mounted module/device/terminal, an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, PRACH transmission and reception methods in the communication system will be described. Even when a method (e.g., transmission or reception of a signal) to be performed at a first communication node among the communication nodes is described, a corresponding second communication node may perform a method (e.g., reception or transmission of the signal) corresponding to the method performed at the first communication node. That is, when an operation of the terminal is described, the corresponding base station may perform an operation corresponding to the operation of the terminal. Conversely, when an operation of the base station is described, the corresponding terminal may perform an operation corresponding to the operation of the base station.

Figure 3:
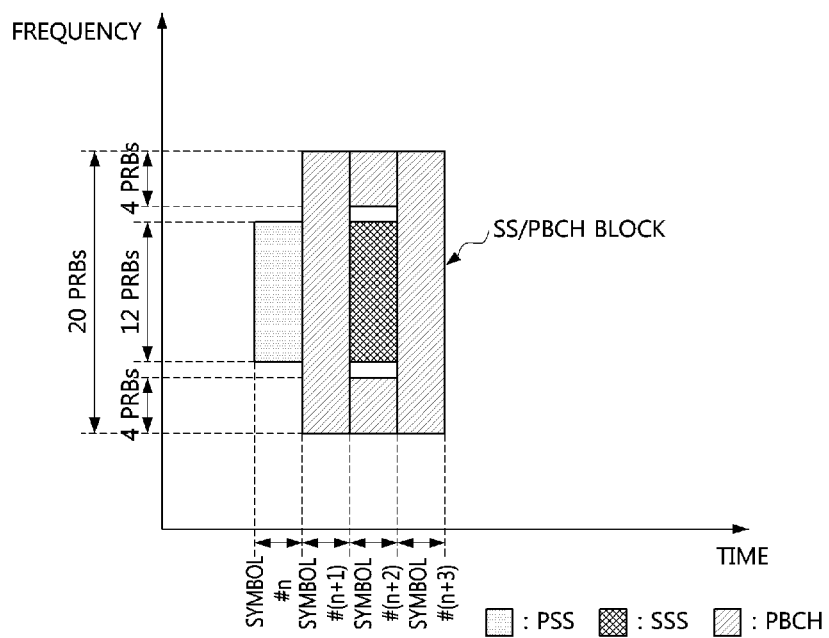
FIG. 3 is a conceptual diagram illustrating a first embodiment of a synchronization signal and physical broadcast channel (SS/PBCH) block in a communication system.

FIG. 3 is a conceptual diagram illustrating a first embodiment of a synchronization signal and physical broadcast channel (SS/PBCH) block in a communication system.

Referring to FIG. 3, a SS/PBCH block may include a primary synchronization signal (PSS), a secondary synchronization signal (SSS), and a physical broadcast channel (PBCH). In addition, the SS/PBCH block may further include a demodulation reference signal (DMRS) used for demodulating the PBCH. The length of the SS/PBCH block in the time axis may correspond to the length of 4 OFDM symbols. In the frequency axis, the size of each of the PSS and SSS included in the SS/PBCH block may correspond to 12 physical resource blocks (PRBs), and the size of the PBCH included in the SS/PBCH block may correspond to 20 PRBs. However, the size of the PBCH included in the SS/PBCH block in the third symbol (e.g., symbol #(n+2)) among the 4 OFDM symbols occupied by the SS/PBCH block may correspond to 2×4 PRBs. Here, n may be an integer of 0 or more.

The SS/PBCH block may be used for transmitting synchronization signals, system information, and the like. The SS/PBCH block may be transmitted by the base station in a broadcast manner. In the communication system, the position in which the SS/PBCH block can be transmitted may be configured in advance, and the position may be referred to as 'candidate SS/PBCH block region'. The candidate SS/PBCH block region may be configured according to a subcarrier spacing. The candidate SS/PBCH block regions may be configured to have a cycle of a radio frame or a half radio frame. The length of the radio frame may be 10 milliseconds (ms), and may include two half radio frames. The length of the half radio frame may be 5 ms and may include a plurality of slots. The maximum number of candidate SS/PBCH block regions in one slot may be two.

FIG. 4 is a conceptual diagram illustrating a first embodiment of candidate SS/PBCH block regions in a communication system.

Referring to FIG. 4, the candidate SS/PBCH block regions may be subframes #0 to #1 in a half radio frame when L=4 in the communication system in which a 15 kHz subcarrier spacing is used. Also, the candidate SS/PBCH block regions may be subframes #0 to #3 in a half radio frame when L=8 in the communication system in which a 15 kHz subcarrier spacing is used. Here, each subframe may comprise a single slot.

FIG. 5 is a conceptual diagram illustrating a second embodiment of candidate SS/PBCH block regions in a communication system.

Referring to FIG. 5, the candidate SS/PBCH block regions may be subframes #0 to #1 in a half radio frame when L=4 in the communication system in which a 30 kHz subcarrier spacing is used. Also, the candidate SS/PBCH block regions may be subframes #0 to #3 in a half radio frame when L=8 in the communication system in which a 30 kHz subcarrier spacing is used. Here, each subframe may comprise 2 slots.

FIG. 6 is a conceptual diagram illustrating a third embodiment of candidate SS/PBCH block regions in a communication system.

Referring to FIG. 6, the candidate SS/PBCH block regions may be subframes #0 to #3, #5 to #8, #10 to #13, #15 to #18, #20 to #23, #25 to #28, #30 to #33, and #35 to #38 in a half radio frame when L=64 in the communication system in which a 60 kHz subcarrier spacing is used. Here, each subframe may comprise 8 slots.

Figure 7:
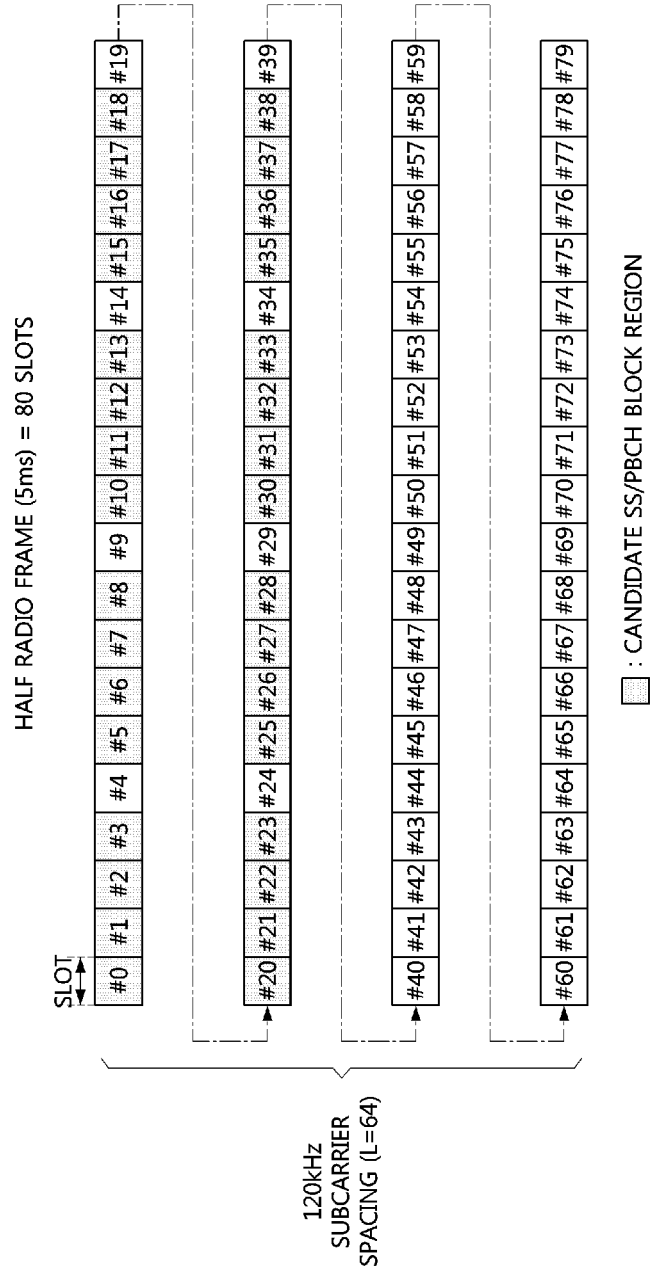
FIG. 7 is a conceptual diagram illustrating a fourth embodiment of candidate SS/PBCH block regions in a communication system.

FIG. 7 is a conceptual diagram illustrating a fourth embodiment of candidate SS/PBCH block regions in a communication system.

Referring to FIG. 7, the candidate SS/PBCH block regions may be subframes #0 to #3, #5 to #8, #10 to #13, #15 to #18, #20 to #23, #25 to #28, #30 to #33, and #35 to #38 in a half radio frame when L=64 in the communication system in which a 120 kHz subcarrier spacing is used. Here, each subframe may comprise 16 slots.

Meanwhile, the candidate SS/PBCH block region in the slot may be configured as follows.

Figure 8:
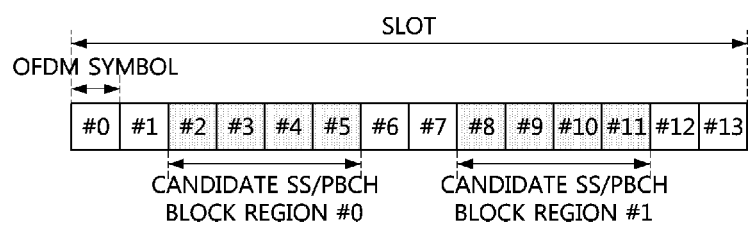
FIG. 8 is a conceptual diagram illustrating a first embodiment of candidate SS/PBCH block regions in a slot in a communication system.

FIG. 8 is a conceptual diagram illustrating a first embodiment of candidate SS/PBCH block regions in a slot in a communication system.

Referring to FIG. 8, one slot may include 14 OFDM symbols, and the candidate SS/PBCH block regions may correspond to OFDM symbols #2 to #5 and #8 to #11. That is, the candidate SS/PBCH block region #0 may be configured to the OFDM symbols #2 to #5 in the slot, and the candidate SS/PBCH block region #1 may be configured to the OFDM symbols #8 to #11 in the slot.

Meanwhile, sequences used in the random access procedure may be classified into long sequences and short sequences. Preamble formats (e.g., preamble formats 0 to 3) of the long sequence may be defined based on Table 1 below. In Table 1, $L_{RA}$ of the long sequence may be 839, and $\Delta f^{RA}$ may be one of 1.25 kHz and 5 kHz.

TABLE 1

| format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24567k | 3168k | Type A, Type B |
| 1 | 839 | 1.25 kHz | 2 · 24576k | 21024k | Type A, Type B |
| 2 | 839 | 1.25 kHz | 4 · 24576k | 4688k | Type A, Type B |
| 3 | 839 | 5 kHz | 4 · 6144k | 3168k | Type A, Type B |

Preamble formats (e.g., preamble formats A to C) of the short sequence may be defined based on Table 2 below. In Table 2, $L_{RA}$ of the short sequence may be 139, and $\Delta f^{RA}$ may be defined as $\Delta f^{RA}=15 \cdot 2^\mu$, and may be one of 0, 1, 2, and 3.

TABLE 2

| format | $L_{RA}$ | $\Delta f^{RA}$ | $N_u$ | $N_{CP}^{RA}$ | Support for restricted sets |
|---|---|---|---|---|---|
| A0 | 139 | $15 \cdot 2^\mu$ kHz | $2048k \cdot 2^{-\mu}$ | $144k \cdot 2^{-\mu}$ | — |
| A1 | 139 | $15 \cdot 2^\mu$ kHz | $2 \cdot 2048k \cdot 2^{-\mu}$ | $288k \cdot 2^{-\mu}$ | — |
| A2 | 139 | $15 \cdot 2^\mu$ kHz | $4 \cdot 2048k \cdot 2^{-\mu}$ | $576k \cdot 2^{-\mu}$ | — |
| A3 | 139 | $15 \cdot 2^\mu$ kHz | $6 \cdot 2048k \cdot 2^{-\mu}$ | $864k \cdot 2^{-\mu}$ | — |
| B1 | 139 | $15 \cdot 2^\mu$ kHz | $2 \cdot 2048k \cdot 2^{-\mu}$ | $216k \cdot 2^{-\mu}$ | — |
| B2 | 139 | $15 \cdot 2^\mu$ kHz | $4 \cdot 2048k \cdot 2^{-\mu}$ | $360k \cdot 2^{-\mu}$ | — |
| B3 | 139 | $15 \cdot 2^\mu$ kHz | $6 \cdot 2048k \cdot 2^{-\mu}$ | $504k \cdot 2^{-\mu}$ | — |
| B4 | 139 | $15 \cdot 2^\mu$ kHz | $12 \cdot 2048k \cdot 2^{-\mu}$ | $936k \cdot 2^{-\mu}$ | — |
| C0 | 139 | $15 \cdot 2^\mu$ kHz | $2048k \cdot 2^{-\mu}$ | $1240k \cdot 2^{-\mu}$ | — |
| C2 | 139 | $15 \cdot 2^\mu$ kHz | $4 \cdot 2048k \cdot 2^{-\mu}$ | $2048k \cdot 2^{-\mu}$ | — |

The long sequence having the preamble format defined in Table 1 may be used in a communication system supporting a frequency band of 6 GHz or below. The short sequence having the preamble format defined in Table 2 may be used in a communication system supporting a frequency band of 6 GHz or above as well as the frequency band of 6 GHz or below. In particular, if the 15 kHz or the 30 kHz subcarrier spacing is used in the communication system supporting the frequency band of 6 GHz or below, the short sequence may be used. If the 60 kHz or the 120 kHz subcarrier spacing is used in the communication system supporting the frequency band of 6 GHz or above, the short sequence may be used. The length of the short sequence according to the preamble format may be as follows.

FIG. 9A is a conceptual diagram illustrating a first embodiment of short sequences according to preamble formats in a communication system.

Referring to FIG. 9A, in one subframe (e.g., a subframe having a length of 1 ms), 14 short sequences (P #0 to #13) having the preamble format A0 may be configured, and 7 short sequences (P #0 to P #6) having the preamble format A1 may be configured. Also, 3 short sequences (P #0 to P #2) having the preamble format A2 may be configured, and 2 short sequences (P #0 to P #1) having the preamble format A3 may be configured.

Figure 9B:
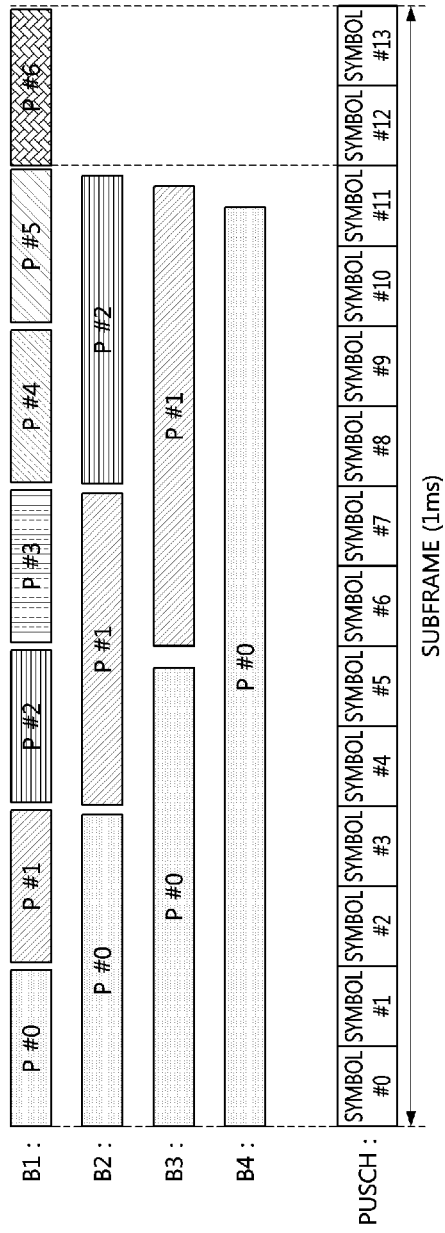
FIG. 9B is a conceptual diagram illustrating a second embodiment of short sequences according to preamble formats in a communication system.

FIG. 9B is a conceptual diagram illustrating a second embodiment of short sequences according to preamble formats in a communication system.

Referring to FIG. 9B, in one subframe (e.g., a subframe having a length of 1 ms), 7 short sequences (P #0 to P #6) having the preamble format B1 may be configured, and 3 short sequences (P #0 to P #2) having the preamble format B2 may be configured. Also, 2 short sequences (P #0 to P #1) having the preamble format B3 may be configured, and 1 short sequence (P #0) having the preamble format B4 may be configured.

Figure 9C:
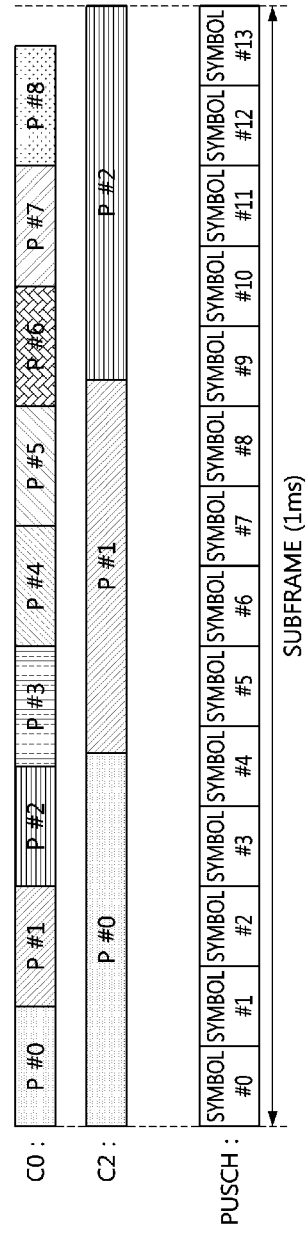
FIG. 9C is a conceptual diagram illustrating a third embodiment of short sequences according to preamble formats in a communication system.

FIG. 9C is a conceptual diagram illustrating a third embodiment of short sequences according to preamble formats in a communication system.

Referring to FIG. 9C, in one subframe (e.g., a subframe having a length of 1 ms), 9 short sequences (P #0 to #8) having the preamble format C0 may be configured, and 3 short sequences (P #0 to P #2) having the preamble format C2 may be configured.

Meanwhile, the size of the PRBs allocated for the PRACH may vary depending on a numerology (e.g., PRACH subcarrier spacing (SCS)). For example, the size (i.e., number) of the PRBs allocated for the PRACH may be defined based on Table 3 below. Here, 'PRACH SCS' may be an SCS applied to the PRACH, 'uplink (UL) SCS' may be an SCS applied to uplink transmission, and 'PRACH PRB size' may be the number of the PRBs allocated for the PRACH.

TABLE 3

| PRACH sequence length ($L_{RA}$) | PRACH SCS (kHz) | UL SCS (kHz) | PRACH PRB size | Subcarriers in guard band |
| --- | --- | --- | --- | --- |
| 839 | 1.25 | 15 | 6 | 25 |
| 839 | 1.25 | 30 | 3 | 25 |
| 839 | 1.25 | 60 | 2 | 313 |
| 839 | 5 | 15, 30, 60 | 24, 12, 6 | 25 |
| 139 | 15 | 15, 30 | 12, 6 | 5 |
| 139 | 15 | 60 | 3 | 5 |
| 139 | 30 | 15, 30, 60 | 24, 12, 6 | 5 |
| 139 | 60 | 60, 120 | 12, 6 | 5 |
| 139 | 120 | 60, 120 | 24, 12 | 5 |

Also, the minimum number and maximum number of PRBs may vary according to the numerology (e.g., SCS) in the communication system. For example, the minimum and maximum number of PRBs may be defined based on Table 4 below.

TABLE 4

| $\mu$ | $N_{RB,DL}^{min,\mu}$ | $N_{RB,DL}^{max,\mu}$ | $N_{RB,UL}^{min,\mu}$ | $N_{RB,UL}^{max,\mu}$ |
| --- | --- | --- | --- | --- |
| 0 | 24 | 275 | 24 | 275 |
| 1 | 24 | 275 | 24 | 275 |
| 2 | 24 | 275 | 24 | 275 |
| 3 | 24 | 275 | 24 | 275 |
| 4 | 24 | 138 | 24 | 138 |
| 5 | 24 | 69 | 24 | 69 |

Here, $N_{RB,DL}^{min,\mu}$ may indicate the minimum number of RBs (e.g., PRBs) in downlink (DL), $N_{RB,DL}^{max,\mu}$ may indicate the maximum number of RBs (e.g., PRBs) in DL, $N_{RB,UL}^{min,\mu}$ may indicate the minimum number of RBs (e.g., PRBs) in uplink (UL), and $N_{RB,UL}^{max,\mu}$ may indicate the maximum number of RBs (e.g., PRBs) in UL.

Method for Mapping PRACH to Physical Resources in Time Domain

Figure 10:
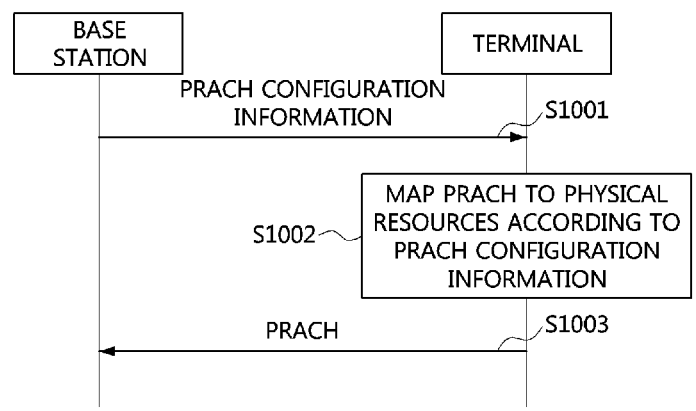
FIG. 10 is a sequence chart illustrating a first embodiment of a method of transmitting and receiving a PRACH in a communication system.

FIG. 10 is a sequence chart illustrating a first embodiment of a method of transmitting and receiving a PRACH in a communication system.

Referring to FIG. 10, the communication system may include a base station, a terminal, and the like, and each of the base station and the terminal may be configured to be the same as or similar to the communication node 200 shown in FIG. 2. The base station may generate PRACH configuration information and transmit a message including the generated PRACH configuration information (S1001). The PRACH configuration information may be transmitted through a PBCH included in an SS/PBCH block. The PRACH configuration information may include a type of a sequence (e.g., a long sequence or a short sequence) used in a random access procedure, a preamble format of the sequence, a PRACH configuration period, resource information of a PRACH slot (e.g., time-frequency resource to which the PRACH slot is allocated, the number of PRACH slots, etc.), a PRACH configuration table, or the like. Alternatively, the PRACH configuration table may be preconfigured in the base station and the terminal. The PRACH configuration period and the PRACH slot may be configured as follows.

Figure 11:
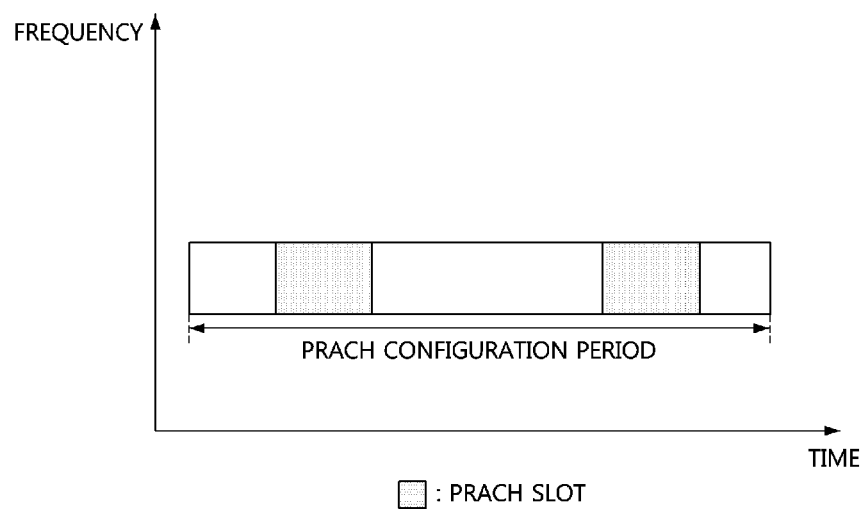
FIG. 11 is a conceptual diagram illustrating a PRACH configuration period and a PRACH slot in a communication system.

FIG. 11 is a conceptual diagram illustrating a PRACH configuration period and a PRACH slot in a communication system.

Referring to FIG. 11, the PRACH configuration period may be set periodically or aperiodically, and one or more PRACH slots may be set within the PRACH configuration period. The PRACH configuration period may be set in units of subframes, half radio frames, or radio frames. The PRACH slot may be used for transmission and reception of a sequence having the preamble format defined in Table 1 or Table 2. The PRACH slot may be composed of one or more slots. When the PRACH slot comprises a plurality of slots, the slots may be located continuously on the time axis. The PRACH configuration period and the PRACH slot may be configured according to numerology (e.g., SCS).

The type of the PRACH slot may be classified into a pure UL slot and a dominant UL slot. The pure UL slot may indicate a slot consisting only of UL symbols. The dominant UL slot may indicate a slot consisting of at least one UL symbol, at least one DL symbol, and at least one unknown symbol. For example, the dominant UL slot may indicate a slot that satisfies at least one of the following conditions. Here, the type of the PRACH slot may be determined based on a slot format indication (SFI).

Condition #1: (the number of UL symbols included in the slot)>(the number of DL symbols included in the slot)

Condition #2: (the number of UL symbols included in the slot)>(the number of unknown symbols included in the slot)

Condition #3: (the number of UL symbols included in the slot)>(the number of DL symbols included in the slot+the number of unknown symbols included in the slot)

Referring again to FIG. 10, the PRACH configuration table for the long sequences may be (Table 1+Table 5). Table 5 below may indicate the length of the PRACH preamble per preamble format of the long sequence (e.g., the length of the available PRACH slot).

TABLE 5

| Format | Length of PRACH preamble (ms) |
| --- | --- |
| 0 | 1 |
| 1 | 3 |
| 2 | 4 |
| 3 | 1 |

When the preamble format 0 or 3 of Table 5 is used, the length of the PRACH preamble may be 1 ms. When the preamble format 1 of Table 5 is used, the length of the PRACH preamble may be 3 ms. Also, when the preamble format 2 of Table 5 is used, the length of the PRACH preamble may be 4 ms.

The PRACH configuration table for the short sequences may be configured in the same manner as the PRACH configuration table for the long sequences described above. For example, the PRACH configuration table for the short sequences may be (Table 2+PRACH slot length per preamble format).

Meanwhile, the terminal may receive the SS/PBCH block from the base station and identify the information (e.g., the PRACH configuration information) included in the SS/PBCH block. The terminal may map a PRACH to the physical resources based on the PRACH configuration information included in the SS/PBCH block (S1002).

For example, when the short sequence is used in the random access procedure, the terminal may determine the type of PRACH slot indicated by the PRACH configuration information. The type of PRACH slot may be determined based on the SFI. A terminal operating in a radio resource control (RRC) connected state can receive the SFI from the base station and determine the type of the PRACH slot as a pure UL slot or a dominant UL slot based on the SFI. On the other hand, since a terminal operating in the RRC idle state cannot receive the SFI from the base station, the terminal may estimate the type of the PRACH slot indicated by the PRACH configuration information as a dominant UL slot.

When the type of the PRACH slot is determined as a pure UL slot, the terminal may map the PRACH from the first symbol in the PRACH slot indicated by the PRACH configuration information. That is, when the pure UL slot is used, the mapping start symbol of the PRACH may be the first symbol in the PRACH slot. Alternatively, when the type of the PRACH slot is determined as a dominant UL slot, the terminal may map the PRACH from a predetermined symbol (e.g., the third symbol) in the PRACH slot indicated by the PRACH configuration information. For example, when the dominant UL slot is used, the mapping start symbol of the PRACH may be the third symbol in the PRACH slot. The predetermined symbol in the PRACH slot may be one of the symbols other than the first symbol among the symbols constituting the PRACH slot.

Alternatively, when the long sequence is used in the random access procedure, the terminal may determine the type of the PRACH slot indicated by the PRACH configuration information as a pure UL slot. When a long sequence is transmitted only in a pure UL slot, the terminal may determine the type of PRACH slot as a pure UL slot regardless of SFI. Accordingly, the terminal may map the PRACH from the first symbol in the PRACH slot indicated by the PRACH configuration information.

The terminal may map the PRACH to the physical resources, and may transmit the PRACH mapped to the physical resources to the base station (S1003). The base station may receive the PRACH from the terminal by monitoring the resources indicated by the PRACH configuration information transmitted in the step S1001.

The above-described PRACH transmission and reception method (e.g., random access procedure) may be applied to a beam failure recovery request procedure, an on-demand system information request procedure, or the like.

Method for Mapping PRACH to Physical Resources in Frequency/Code Domain

Meanwhile, in order to support all PRACH transmission occasions in a communication system supporting a time division multiplexing (TDM) scheme, the PRACH configuration period and the PRACH slots (e.g., the number of the PRACH slots) allocated by the base station may not be sufficient. The PRACH transmission occasion may indicate a region where the PRACH transmission occurs. For example, when a long sequence having the preamble format 1 or 2, a short sequence having the preamble format A3, B3, B4, or C2, or the like is used, the PRACH configuration period and the PRACH slots allocated by the base station may not be sufficient for transmission of the PRACH configured with corresponding sequence. In this case, the PRACH may be multiplexed based on at least one of a frequency division multiplexing (FDM) scheme and a code division multiplexing (CDM) scheme.

When a long sequence is used, the PRACH multiplexing may be performed based on Table 6 below. When a short sequence is used, the PRACH multiplexing may be performed based on Table 7 below. $N_{PRACH,FDM}^{max}$ may indicate the maximum number of PRACHs (e.g., sequences constituting the PRACHs) that can be multiplexed in the FDM scheme.

TABLE 6

| PRACH sequence length ($L_{RA}$) | PRACH SCS (kHz) | UL SCS (kHz) | PRACH PRB size | $N_{PRACH,FDM}^{max}$ | Multiplexing schemes, that can be used, other than TDM |
|---|---|---|---|---|---|
| 839 | 1.25 | 15 | 6 | 4 | FDM/CDM |
| 839 | 1.25 | 30 | 3 | 4 | FDM/CDM |
| 839 | 1.25 | 60 | 2 | 3 | FDM/CDM |
| 839 | 5 | 15 | 24 | 1 | CDM |
| 839 | 5 | 30 | 12 | 1 | CDM |
| 839 | 5 | 60 | 6 | 1 | CDM |

TABLE 7

| PRACH sequence length ($L_{RA}$) | PRACH SCS (kHz) | UL SCS (kHz) | PRACH PRB size | $N_{PRACH,FDM}^{max}$ | Multiplexing schemes, that can be used, other than TDM |
|---|---|---|---|---|---|
| 139 | 15 | 15 | 12 | 2 | FDM/CDM |
| 139 | 15 | 30 | 6 | 2 | FDM/CDM |
| 139 | 15 | 60 | 3 | 2 | FDM/CDM |
| 139 | 30 | 15 | 24 | 1 | CDM |
| 139 | 30 | 30 | 12 | 1 | CDM |
| 139 | 30 | 60 | 6 | 1 | CDM |
| 139 | 60 | 60 | 12 | 2 | FDM/CDM |
| 139 | 60 | 120 | 6 | 2 | FDM/CDM |
| 139 | 120 | 60 | 24 | 1 | CDM |
| 139 | 120 | 120 | 12 | 1 | CDM |

Each of Table 6 and Table 7 may be referred to as the 'PRACH configuration table'. The information (e.g., the PRACH configuration table) described in Table 6 and Table 7 may be preconfigured in the base station and the terminal. Alternatively, the base station may transmit an SS/PBCH block containing the information described in Table 6 and Table 7, and the terminal may identify the information described in Table 6 and Table 7 based on the SS/PBCH block received from the base station.

Referring to Table 4 and Table 6, when the minimum number of PRBs for 15 kHz UL SCS is 24 and the PRACH PRB size is 6, $N_{PRACH,FDM}^{max}$ may be (the minimum number of PRBs/the PRACH PRB size). That is, $N_{PRACH,FDM}^{max}$ may be 6. In the same manner, $N_{PRACH,FDM}^{max}$ described in Table 6 and Table 7 may be determined.

Meanwhile, in order to reduce the size of the PRACH configuration table (e.g., Tables 6 and 7), $N_{PRACH,FDM}^{max}$ may be set to a value smaller than the maximum value. For example, when 1.25 kHz PRACH SCS in Table 6 is used, $N_{PRACH,FDM}^{max}$ may be set to a value (e.g., 1, 2, or 3) less than 4. In this case, Table 6 may be redefined as Table 8 below, and Table 7 may be redefined as Table 9 below.

TABLE 8

| PRACH sequence length ($L_{RA}$) | PRACH SCS (kHz) | $N_{PRACH,FDM}^{max}$ | Multiplexing schemes, that can be used, other than TDM |
|---|---|---|---|
| 839 | 1.25 | 3 (or, 2, 1) | FDM/CDM |
| 839 | 5 | 1 | CDM |

TABLE 9

| PRACH sequence length ($L_{RA}$) | PRACH SCS (kHz) | $N_{PRACH,FDM}^{max}$ | Multiplexing schemes, that can be used, other than TDM |
|---|---|---|---|
| 139 | 15 | 2 (or, 1) | FDM/CDM |
| 139 | 30 | 1 | CDM |
| 139 | 60 | 2 (or, 1) | FDM/CDM |
| 139 | 120 | 1 | CDM |

On the other hand, even when the PRACHs are multiplexed based on the TDM scheme and the FDM scheme, the number of PRACH slots in the PRACH configuration period may not be sufficient to transmit the PRACHs. In this case, the PRACHs may be multiplexed in the CDM scheme, and the maximum number of PRACHs (e.g., sequences included in the PRACHs) that can be multiplexed in the CDM scheme may be predefined.

For example, when the maximum of 32 sequences are configured for different cells and the maximum number of configurable sequences per cell is 64, the maximum number of PRACHs that can be multiplexed in the CDM scheme in the same time-frequency resource may be 2. Here, a cell may be an area covered by one SS/PBCH block, and the maximum number of configurable sequences for each cell may be variously set.

Method for Mapping PRACH to Physical Resources Based on PRACH Configuration Table In the communication system, the number of SS/PBCH block transmissions may be very large, and the PRACH slots may be configured regardless of the transmission of the SS/PBCH block. When a long sequence is used, a collision problem between the PRACH slot and the SS/PBCH block may not occur since the long sequence is transmitted only in a pure UL slot. On the other hand, when a short sequence is transmitted in a dominant UL slot, a collision may occur between the PRACH slot and the SS/PBCH block.

The terminal operating in the RRC idle state may identify the actual transmission position of the SS/PBCH block based on a bit map included in remaining minimum system information (RMSI). The terminal operating in the RRC connection state may identify the actual transmission position of the SS/PBCH block based on an RRC message or a handover command. Therefore, the terminal may identify the actual transmission position of the SS/PBCH block before performing the random access procedure.

When a long sequence is used and it is determined that the PRACH slot is overlapped with the actual transmission position of the SS/PBCH block, the terminal may not transmit the PRACH (e.g., the PRACH including the long sequence) in the PRACH slot overlapped with the actual transmission position of the SS/PBCH block. In this case, the terminal may determine that the PRACH to be transmitted in the PRACH slot overlapped with the actual transmission position will be transmitted together with a different PRACH in the next PRACH slot based on the multiplexing scheme.

Also, when a short sequence having the preamble format A3, B3 or B4 is used and it is determined the PRACH slot is overlapped with the actual transmission position of the SS/PBCH block, the terminal may not transmit the PRACH (e.g., the PRACH including the short sequence having the preamble format A3, B3 or B4) in the PRACH slot overlapped with the actual transmission position of the SS/PBCH block. In this case, the terminal may determine that the PRACH to be transmitted in the PRACH slot overlapped with the actual transmission position will be transmitted together with a different PRACH in the next PRACH slot based on the multiplexing scheme.

Also, when a short sequence having the preamble format A0, A1, A2, B1, B2, C0 or C2 is used and it is determined the PRACH slot is overlapped with the actual transmission position of the SS/PBCH block, the terminal may not transmit the PRACH (e.g., the PRACH including the short sequence having the preamble format A0, A1, A2, B1, B2, C0 or C2) in the PRACH slot (e.g., a half slot in the PRACH slot) overlapped with the actual transmission position of the SS/PBCH block. In this case, the terminal may determine that the PRACH to be transmitted in the PRACH slot overlapped with the actual transmission position will be transmitted together with a different PRACH in the next PRACH slot based on the multiplexing scheme.

For example, when a long sequence having the preamble format 0 is configured to the terminal, the terminal may first identify the type of the PRACH slot (e.g., pure UL slot or dominant UL slot). When the type of the PRACH slot is a dominant UL slot, the terminal may not use the corresponding PRACH slot and may determine that the PRACH to be transmitted in the corresponding PRACH slot will be transmitted together with a different PRACH in the next PRACH slot based on the multiplexing scheme.

Association Between Channel State Information-Reference Signal (CSI-RS) and PRACH Resource In order to report a beam index in the random access procedure, an association between the SS/PBCH block and the PRACH resource (e.g., PRACH configuration information, PRACH slot) may be required. Also, an association between a CSI-RS and the PRACH resource may be required. Here, an index of an SS/PBCH block may be indicated by a CSI-RS. Thus, the association between the CSI-RS and the PRACH resource may be configured based on the association between the SS/PBCH block and the PRACH resource. The sequence transmitted through the PRACH resource associated with the SS/PBCH block may differ from the sequence transmitted through the PRACH resource associated with the CSI-RS.

For example, when the PRACH resource associated with the SS/PBCH block is the same as the PRACH resource associated with the CSI-RS and a first sequence transmitted through the PRACH resource associated with the SS/PBCH block is different from a second sequence transmitted through the PRACH resource associated with the CSI-RS, the first sequence may be multiplexed with the second sequence based on at least one of the TDM scheme, the FDM scheme and the CDM scheme in the corresponding PRACH resource.

Meanwhile, the index of the SS/PBCH block may be indicated based on the following methods.

The CSI-RS may be generated based on a sequence indicating a different SS/PBCH block (or a different SS/PBCH block group). Here, the SS/PBCH block group may include one or more SS/PBCH blocks.

The CSI-RS may be generated based on a sequence belonging to a sequence group indicating a different SS/PBCH block (or a different SS/PBCH block group).

The transmission position of the CSI-RS may indicate a different SS/PBCH block (or a different SS/PBCH block group).

The CSI-RS may be coded and/or scrambled based on a sequence indicating a different SS/PBCH block (or a different SS/PBCH block group).

Here, the CSI-RS may indicate one or more SS/PBCH block indexes (or one or more SS/PBCH block group indexes). Alternatively, a plurality of CSI-RSs may indicate the same SS/PBCH block index (or the same SS/PBCH block group index). The number of PRACH resources associated with the CSI-RS may be different from the number of PRACH resources associated with the SS/PBCH block.

Therefore, the terminal may identify the SS/PBCH block associated with the corresponding CSI-RS based on the CSI-RS received from the base station, identify the PRACH resource associated with the identified SS/PBCH block, and transmit the PRACH in the identified PRACH resource.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving a message from a base station, the message including multiplexing information indicating a maximum number of physical random access channel (PRACH) occasions which are multiplexed in a frequency domain of a PRACH slot and PRACH configuration information indicating a PRACH configuration period, a number of PRACH slots in the PRACH configuration period, and a number of PRACH occasions multiplexed in each of the PRACH slots;
   determining physical resources used for transmitting a random access (RA) preamble based on the multiplexing information and the PRACH configuration information; and
   transmitting the RA preamble in the determined physical resources to the base station,
   wherein when the terminal operates in a radio resource control (RRC) idle state, a type of the PRACH slots is determined to be a dominant uplink slot which comprises at least one uplink symbol, at least one unknown symbol, and at least one downlink symbol.

2. The operation method according to claim 1, wherein the message including the multiplexing information and the PRACH configuration information is a synchronization signal and physical broadcast channel (SS/PBCH) block.

3. The operation method according to claim 1, wherein the type of each of the PRACH slots is determined based on a slot format indication (SFI) received from the base station, when the terminal operates in an RRC connected state.

4. The operation method according to claim 1, wherein the PRACH occasions are multiplexed in each of the PRACH slots based on a frequency division multiplexing (FDM) scheme and a code division multiplexing (CDM) scheme.

5. An operation method of a base station in a communication system, the operation method comprising:
   determining multiplexing information indicating a maximum number of physical random access channel (PRACH) occasions which are multiplexed in a frequency domain of a PRACH slot;
   determining a PRACH configuration information indicating a PRACH configuration period, a number of PRACH slots in the PRACH configuration period, and a number of PRACH occasions multiplexed in each of the PRACH slots;
   generating a message including the multiplexing information and the PRACH configuration information; and
   transmitting the message to a terminal,
   wherein when the terminal operates in a radio resource control (RRC) idle state, a type of the PRACH slots is determined to be a dominant uplink slot which comprises at least one uplink symbol, at least one unknown symbol, and at least one downlink symbol.

6. The operation method according to claim 5, wherein the number of PRACH occasions which are multiplexed in the frequency domain is 1, 2, or 4.

7. The operation method according to claim 5, wherein a start symbol to which a PRACH occasion is mapped among symbols constituting each of the PRACH slots is determined based on the type of each of the PRACH slots.

8. The operation method according to claim 5, wherein the message is a synchronization signal and physical broadcast channel (SS/PBCH) block.

9. A terminal in a communication system, the terminal comprising:
   a processor and a memory storing at least one instruction executed by the processor,
   wherein the at least one instruction is configured to:
   receive a message from a base station, the message including multiplexing information indicating a maximum number of physical random access channel (PRACH) occasions which are multiplexed in a frequency domain of a PRACH slot and PRACH configuration information indicating a PRACH configuration period, a number of PRACH slots in the PRACH configuration period, and a number of PRACH occasions multiplexed in each of the PRACH slots;
   determine physical resources used for transmitting a random access (RA) preamble based on the multiplexing information and the PRACH configuration information; and
   transmit the RA preamble in the physical resources to the base station,
   wherein when the terminal operates in a radio resource control (RRC) idle state, a type of the PRACH slots is determined to be a dominant uplink slot which comprises at least one uplink symbol, at least one unknown symbol, and at least one downlink symbol.

10. The terminal according to claim 9, wherein the type of each of the PRACH slots is determined based on a slot format indication (SFI) received from the base station, when the terminal operates in an RRC connected state.

11. The terminal according to claim 9, wherein the PRACH occasions are multiplexed in each of the PRACH slots based on a frequency division multiplexing (FDM) scheme and a code division multiplexing (CDM) scheme.

12. The operation method according to claim 1, wherein the number of PRACH occasions which are multiplexed in the frequency domain is 1, 2, or 4.

13. The terminal according to claim 9, wherein the number of PRACH occasions which are multiplexed in the frequency domain is 1, 2, or 4.

* * * * *